3,595,833
COLD CURING EPOXY RESIN COMPOSITION
Ralph E. Stolton, Tolworth, Surrey, England, assignor to Shell Oil Company, New York, N.Y.
No Drawing. Filed Nov. 4, 1968, Ser. No. 773,308
Int. Cl. C08g 30/14
U.S. Cl. 260—47            9 Claims

ABSTRACT OF THE DISCLOSURE

Novel curing compositions useful in curing epoxy resins at low temperatures and having improved storage stability are provided comprising a mixture of (1) an aromatic polyamine, (2) a polyalkene sulfone, (3) a component from the group consisting of dialkyl sulfoxides, cyclohexanone or alkyl substituted cyclohexanones, and (4) salicyclic acid and/or lactic acid.

BACKGROUND OF THE INVENTION

This invention relates to novel compositions and their use as agents for curing epoxy resins, more particularly the invention provides new curing agent compositions which are highly efficient at temperatures as low as 0° C. and which remain effective without undesirable decomposition during storage at room temperature (20° C.) for a period of at least six months.

Epoxy resins such as the commercially available glycidyl poly ethers of polyhydric phenols can be cured to hard insoluble products with aromatic amines at high temperatures. This is undesirable for certain applications such as for outdoor operations and for coating large surface areas such as roadways, airport runways etc., where it is difficult to maintain high temperatures. It is known that by use of other types of agents such as polymercaptans it has been possible to obtain a cure at lower temperatures, but use of such agents causes other difficulties, such as odor, limited physical properties and the like. Another known agent mixture contains ethylene and/or propylene carbonate, as described in U.S. 3,397,177 but has the decided disadvantage of instability on storage i.e. decomposition takes place within a short time, with attended release of gas, solids deposition etc.

SUMMARY OF THE INVENTION

Specifically the invention provides novel compositions which are particularly effective for curing epoxy resins having an average of more than one vic epoxy group per molecule which comprises a mixture of (1) an aromatic polyamine which contains in its molecular structure primary and/or secondary amino groups (2) an alkylene sulfone (3) a component from the group consisting of dialkyl sulfoxides, cyclohexanone or alkyl substituted cyclohexanones and (4) salicylic acid and/or lactic acid as an accelerator. The invention also provides a process for using these novel curing compositions to convert epoxy resins to cured products, which comprises mixing and reacting the uncured epoxy resins with a curing agent of said compositions to hard insoluble infusible products at a temperature preferably in the range between 0° C. and 30° C. The present invention also includes an epoxy resin cured by said process and articles coated with said epoxy resin.

It is an object of the invention to provide a class of improved curing agents for curing epoxy resins. It is a further object to provide new curing agents and a method for their preparation. It is a further object to provide new curing agent compositions which can be used to cure epoxy resins at low temperatures. It is a further object to provide new curing agent compositions which will remain effective as a curing agent without undesirable decomposition occurring during storage period of at least six months at 20° C. Other and further objects and advantages of the inventions will become apparent to those skilled in the art upon consideration of the accompanying disclosure.

DESCRIPTION OF PREFERRED EMBODIMENTS

Any known or suitable epoxy resin can be used in carrying out the process of the present invention; for example, a suitable epoxy resin can be produced by reacting a polyhydric phenol or a polyhydric alcohol with either epichlorohydrin or epibromohydrin in an alkaline medium. The polyhydric phenol can contain one or more aromatic nuclei in its molecular structure. Examples of suitable polyhydric phenols are mononuclear polyhydric phenols, for example alkylated or unalkylated resorcinols, catechols, pyrogallols and hydroquinones, and dinuclear phenols, for example 4,4'-dihydroxy-benzophenone, 1-2-di (4'-hydroxyphenyl) ethane and 2,2-di (4'-hydroxyphenyl) propane, which is known as Bisphenol A, and tetrahydric phenols, for example tetraphenylolethane. Examples of suitable polyhydric alcohols are glycerol, trimethylol propane and pentaerythritol. The resulting epoxy resin which conveniently has a molecular weight below 1200 and preferably below 600, is preferably a liquid. Examples of suitable liquid epoxy resins are diglycidyl phthalate and the diglycidyl ether of Bisphenol A. Particularly suitable epoxy resins for use in carrying out the present invention are derived from Bisphenol A and have molecular weights within the range 300 to 500 and contain at least 1.6 vicepoxy groups per molecule. Such epoxy resins can be prepared by reacting epichlorohydrin in an alkaline medium with Bisphenol A, the molar ratio of epichlorohydrin to Bisphenol A being at least 4:1 and preferably 10:1. Other examples of suitable epoxy resins may be found in U.S. 2,633,458.

Although triamines, for example, 1,3,5-triaminobenzene can be used as said aromatic polyamine in the present invention, aromatic diamines are preferred to obtain superior mechanical properties of the resulting cured epoxy resin. Examples of aromatic diamines which can be used are 1,2-diphenylene diamine, 1,3-diphenylene diamine, 1,4 - diphenylenediamine, 4,4'-diaminodiphenyl sulphide, 4,4' - diaminodiphenyl sulphone, 2,2' - diaminodiphenylmethane, 4,4'-di(N-methylamino) diphenylmethane, 4,4'-di(N-ethylamino) diphenylmethane and 4,4'-di(N-butylamino) diphenylmethane. Preferred aromatic diamines are 3,3'-diaminodiphenylmethane, 3,4'-diaminodiphenylmethane, 4,4'-diaminodiphenylmethane, 3,3'-diaminodiphenyldimethylmethane, 3,4' - diaminodiphenyldimethylmethane and 4,4'-diaminodiphenyldimethylmethane.

Examples of the alkylene sulphone which can be used in carrying out the present invention are trimethylene sulphone (sulfolane), 3,3-dimethyltrimethylene sulfone, pentamethylene sulfone, 2 - methyltetrahydro - 1-thiapyran - 1,1 - dioxide, 3-methyltetrahydro-1,1-thiapyran-1, 1 - dioxide and 4 - methyltetrahydro - 1 - thiapyran-1,1-dioxide. Sulfolane is the preferred alkylene sulfone, because of its availability.

The choice of the third component is an important feature of the present invention since it enables one to achieve curing agents of suitable curing activity at low temperatures which are storage stable in the sense that the curing agents are not susceptible to undesirable decomposition or solids deposition (crystallisation) even when stored for lengthy periods at temperatures between 0 and 60° C. prior to use. This third component is preferably a dialkyl sulfoxide, for example, dimethyl sulfoxide, diethyl sulfoxide or diisopropyl sulfoxide; but it is also feasible to use cyclohexanone or an alkyl-substituted cyclohexanone, for example, methyl cyclohexanone, ethyl cyclohexanone or hexylcyclo hexanone. Preferred alkyl groups in the dialkylsulfoxide and the alkyl-substituted cyclohexanone contain from 1 to 6 carbon atoms.

The alkylene sulphone and the third component should be present in such relative proportions and in such amount with respect to the aromatic polyamine as to give a liquid curing agent which does not crystallize on standing for 6 months at 0° C. For example, when the alkylene sulfone is sulfolane and the third component is dimethyl sulfoxide, the sulfolane comprises 30% to 90% of the total weight of sulfolane and dimethyl sulfoxide, and preferably 50% to 85% of said total weight.

The amount of the aromatic polyamine used can be varied within wide limits; for example, it can be from 80 to 120% of the stoichiometric quantity required for reaction with the vic-epoxy groups of the epoxy resin. Advantageously, the amount of the aromatic polyamine used is from 92 to 108% and preferably from 95 to 105% of said stoichiometric quantity.

The amount of said cure accelerator can also be varied within wide limits; for example, it can be from 0.1 to 10% by weight of the epoxy resin, the preferred amount being from 0.3 to 5% by weight of the epoxy resin.

If the epoxy resin is cured at temperatures of from about 15 to about 30° C. it is preferred to use lactic acid as the cure accelerator but if the epoxy resin is cured at temperatures of from about 0 to about 10° C. it is preferred to use salicylic acid as the cure accelerator. A system which comprises as the cure accelerator a mixture of lactic and salicylic acid can conveniently be used for curing the epoxy resin over a temperature range from about 0° C. to about 30° C.

The process of the present invention can be carried out in the presence of a so-called reactive diluent, which is known in the art for the purpose of reducing the viscosity of epoxy resins. The quantity of the reactive diluent can be, for example, from 5 to 15 parts by weight per 100 parts by weight of the epoxy resin. Examples of suitable reactive diluents are pine oil, furfuryl alcohol and the alkyl glycidyl ethers, for example n-butyl glycidyl ether and iso-octyl glycidyl ether.

A particularly preferred curing agent in accordance with the present invention comprises a 45 to 55% by weight solution of a 3,3'- or 3,4'- or 4,4'-diaminodiphenylmethane in a liquid medium consisting of from 50 to 90% by weight of sulfolane and from 10 to 50% by weight of dimethyl sulfoxide, which solution contains salicylic acid as the cure accelerator.

The present invention is illustrated by the following examples:

EXAMPLE 1

100 parts by weight of a commercially available epoxy resin having an epoxide equivalent weight of 185–215 were mixed in a mold at a temperature of 0–5° C. with a mixture comprising 25 parts by weight of 4,4'-diaminodiphenylmethane, 16.7 parts by weight of sulfolane, 4.15 parts by weight of dimethylsulfoxide and 4.15 parts by weight of salicylic acid. The resultant casting was cured for 7 days at a temperature of 0–3° C. It had the following properties:

Heat deflection—28° C.
Tensile strength—4250 pounds per square inch
Elongation—45%

The heat deflection was determined according to ASTM No. D698–56 and the tensile strength and elongation were determined according to ASTM No. D638–60T.

EXAMPLE 2

100 parts by weight of the commercially available epoxy resin 828, having an epoxide equivalent weight of 184–194 were mixed in a mold at 23° C. with a mixture comprising 25 parts by weight of 4,4'-diaminodiphenylmethane, 19.1 parts by weight of sulfolane, 4.8 parts by weight of dimethylsulfoxide and 1.1 parts by weight of salicylic acid. The resultant casting was cured for 7 days at 23° C. The casting had the following properties:

Heat deflection—46° C.
Tensile strength—7350 pound per square inch
Elongation—3%

EXAMPLE 3

A curing composition is prepared by mixing 50 parts by weight of 4,4'-diaminodiphenylmethane, 49 parts by weight of sulfolane and 1 part by weight of salicylic acid. Upon storage at 23° C. within a few weeks degradation of the mixture is evidenced by deposition of a sludge containing fine crystals.

EXAMPLE 4

A curing composition is prepared by mixing 50 parts by weight of 4,4'-diaminodiphenylmethane, 9.8 parts by weight of ethylene carbonate, 39.2 parts by weight of sulfolane and 1 part by weight of salicylic acid. Upon storage at 23° C. within a few weeks, decomposition of the mixture is evidenced by the evolution of bubbles of gas.

EXAMPLE 5

Example 4 is repeated with the exception that the ethylene carbonate is replaced with propylene carbonate and the salicylic acid is replaced with lactic acid. Decomposition within a few weeks is again observed.

EXAMPLE 6

A curing composition was prepared by mixing 50 parts by weight of 4,4' - diaminodiphenylmethane, 9.8 parts by weight of dimethylsulfoxide 39.2 parts by weight of sulfolane and 1 part by weight of salicylic acid. Upon storage at 0° C. the viscosity of this composition remained constant during 80 days at 3.15 stokes. Upon storage at 23° C. the initial viscosity of 0.515 stokes increased to 0.58 stokes after 30 days and remained thereafter constant during at least 120 days. No decomposition could be noticed during this lengthy period.

EXAMPLE 7

A curing composition was prepared by mixing 50 parts by weight of 4,4'-diaminodiphenylmethane, 8.4 parts by weight of dimethyl sulfoxide, 33.6 parts by weight of sulfolane and 8 parts by weight of salicylic acid. Upon storage at 23° C., the initial viscosity of 1.33 stokes rose to 1.50 stokes after 60 days. The viscosity remained thereafter constant during 120 days. Upon storage at 0° C. the viscosity of 16.72 stokes remained unchanged during 80 days. In these storage tests no decomposition of the composition could be noticed.

I claim as my invention:

1. A process for curing an epoxy resin having an average number of vic-epoxy groups per molecule of more than one which comprises contacting the epoxy resin at a temperature from about 0° C. to about 30° C. with a mixture of (1) an aromatic polyamine which contains in its molecular structure at least one primary or secondary amino group, in an amount of from 80 to 120% of the stoichiometric quantity required for reaction with the vic-epoxy groups of the epoxy resin; (2) an alkylene sulfone, (3) a component from the group consisting of a dialkyl sulfoxide, cyclohexanone and an alkyl-substituted cyclohexanone; the alkylene sulfone and component (3) being present in such quantities that a solution of the aromatic polyamine in an alkylene sulfone and either a dialkyl sulfoxide, cyclohexanone or alkyl-substituted cyclohexanone does not crystallize on standing for 6 months at 0° C.; and (4) a cure accelerator consisting essentially of at least one of salicylic or lactic acid in an amount of from 0.1 to 10% by weight of the epoxy resin.

2. A process as in claim 1, in which the alkylene sulfone is sulfolane.

3. A process as in claim 1, in which component (3) is dimethylsulfoxide.

4. A process as in claim 1 in which the aromatic polyamine is 3,3'- or 3,4'- or 4,4'-diaminodiphenylmethane.

5. A process as in claim 1 in which the cure accelerator is salicylic acid.

6. A process as in claim 1 in which the epoxy resin has a molecular weight below 1200.

7. A process as in claim 1 wherein the quantity of the cure accelerator is from 0.3 to 5% by weight of the epoxy resin.

8. A new curing agent composition comprising a mixture of (1) an aromatic polyamine which contains in its molecular structure at least one primary or secondary amino group, (2) an alkylene sulfone, (3) a member of the group consisting of dialkyl sulfoxides, cyclohexanone and alkyl-substituted cyclohexanone and (4) at least one of salicylic or lactic acid.

9. A new curing agent composition according to claim 8 comprising a 45 to 55% by weight solution of a 3,3'- or 3,4'- or 4,4'-diaminodiphenylmethane in a liquid medium consisting of 50 to 90% by weight of sulfolane and from 10 to 50% by weight of dimethylsulfoxide, which contains salicylic acid as the cure accelerator.

References Cited

UNITED STATES PATENTS 3,277,051  10/1966  Wynstra _____ 260—30.8
3,397,177  8/1968  Stolton _____ 260—47EPC WILLIAM H. SHORT, Primary Examiner T. E. PERTILLA, Assistant Examiner U.S. Cl. X.R.

252—182; 260—2